US010400884B2

(12) United States Patent
Rake et al.

(10) Patent No.: US 10,400,884 B2
(45) Date of Patent: Sep. 3, 2019

(54) METHOD AND DEVICE FOR PRODUCING A BEARING ELEMENT OF A SHIFTING DEVICE FOR A VEHICLE TRANSMISSION, AND BEARING ELEMENT AND SHIFTING DEVICE FOR A VEHICLE TRANSMISSION (71) Applicant: ZF Friedrichshafen AG, Friedrichshafen (DE)

(72) Inventors: Ludger Rake, Steinfeld (DE); Andreas Giefer, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 194 days.

(21) Appl. No.: 15/549,100

(22) PCT Filed: Jan. 11, 2016

(86) PCT No.: PCT/EP2016/050330
§ 371 (c)(1),
(2) Date: Aug. 4, 2017

(87) PCT Pub. No.: WO2016/124355
PCT Pub. Date: Aug. 11, 2016

(65) Prior Publication Data
US 2018/0023686 A1 Jan. 25, 2018

(30) Foreign Application Priority Data
Feb. 5, 2015 (DE) .................. 10 2015 201 974

(51) Int. Cl.
*B60K 20/00* (2006.01)
*F16H 59/04* (2006.01)
(Continued)

(52) U.S. Cl.
CPC .... *F16H 59/0204* (2013.01); *B29C 45/14311* (2013.01); *B29C 45/14754* (2013.01);
(Continued)

(58) Field of Classification Search
CPC ......... F16H 59/0278; F16H 2059/0273; F16H 59/02; B29C 45/14754
See application file for complete search history.

(56) References Cited

U.S. PATENT DOCUMENTS 3,602,060 A  8/1971 Nagg
5,934,145 A  8/1999 Ersoy et al.
(Continued)

FOREIGN PATENT DOCUMENTS

DE  18 00 163  4/1970
DE  196 37 254 A1  3/1998
(Continued)

OTHER PUBLICATIONS

International Search Report dated Apr. 15, 2016 in International Application No. PCT/EP2016/050330, 3 pages, English Language.
(Continued)

*Primary Examiner* — Jake Cook
(74) *Attorney, Agent, or Firm* — Brinks Gilson & Lione (57) ABSTRACT The invention relates to a method for the manufacturing of a bearing element of a shift device for a motor vehicle transmission. In a first process step a bearing element is provided, which comprises at least one projection and a coupling joint for the mechanical coupling of a selector lever in order to select a shift position of a motor vehicle transmission. The projection is overmolded by means of an assembly injection molding process with a bearing bushing material in order to form a bearing bushing to mount the bearing element in a moveable manner.

20 Claims, 9 Drawing Sheets (51) Int. Cl.
*F16H 59/02* (2006.01)
*B29C 45/14* (2006.01)
*B29K 67/00* (2006.01)
*B29K 677/00* (2006.01)
*B29L 31/00* (2006.01)

(52) U.S. Cl.
CPC .... *F16H 59/02* (2013.01); *B29C 2045/14762* (2013.01); *B29K 2067/006* (2013.01); *B29K 2677/00* (2013.01); *B29L 2031/748* (2013.01); *F16H 2059/0273* (2013.01)

(56) References Cited

U.S. PATENT DOCUMENTS

| | | | |
|---|---|---|---|
| 2008/0020885 A1* | 1/2008 | Vermeersch | F16H 61/26 475/5 |
| 2008/0098841 A1 | 5/2008 | Vermeersch | |
| 2013/0340558 A1* | 12/2013 | Kvarnstrom | F16H 59/105 74/473.33 |

FOREIGN PATENT DOCUMENTS

| | | |
|---|---|---|
| DE | 199 18 509 A1 | 12/2000 |
| DE | 102 39 173 A1 | 3/2004 |
| DE | 10 2004 056 777 A1 | 6/2006 |
| DE | 20 2007 000 210 U1 | 4/2007 |
| DE | 10 2012 002 913 A1 | 9/2012 |

OTHER PUBLICATIONS

International Search Report dated Apr. 15, 2016 in International Application No. PCT/EP2016/050330, 4 pages, German Language.
Written Opinion of the International Search Authority dated Jan. 11, 2016 in International Application No. PCT/EP2016/050330, 6 pages, German Language.
German Office Action in priority application DE 10 2015 201 974.8 dated Oct. 30, 2015, in German language, 7 pages.

* cited by examiner

METHOD AND DEVICE FOR PRODUCING A BEARING ELEMENT OF A SHIFTING DEVICE FOR A VEHICLE TRANSMISSION, AND BEARING ELEMENT AND SHIFTING DEVICE FOR A VEHICLE TRANSMISSION

This application is a filing under 35 U.S.C. § 371 of International Patent Application PCT/EP2016/050330, filed Jan. 11, 2016, and claims the priority of DE 10 2015 201 974.8, filed Feb. 5, 2015. These applications are incorporated by reference herein in their entirety.

The present disclosure relates to a method and a device for the manufacturing of a bearing element of a shift device for a motor vehicle transmission, to a bearing element and a shift device for a motor vehicle transmission, as well as to a device for carrying out or for controlling the process.

A selector lever to operate a motor vehicle transmission can be provided with a gimbal bearing. The selector lever can e.g. be moveably mounted in a crosspiece. The selector lever is hereby usually moveably mounted in a crosspiece by means of a knurl bolt. The crosspiece is moveably mounted in a housing by means of one or more separate bushings in order to improve a smooth motion and to reduce any bearing clearance. However, the separate bushings cause an increase in tolerances and in the mounting expenses.

In view of the above, the suggested approach presents a method for the manufacturing of a bearing element of a shift device for a motor vehicle transmission, a device that uses this method, as well as a bearing element and a shift device for a motor vehicle transmissions according to the main claims. Advantageous embodiments can be derived from the subclaims and from the following description.

The present approach is based on the knowledge that each component in a shift device, that is moveable in relation to the other, can be manufactured by means of one common procedure with lesser process steps and in a cost-effective manner. The present approach thus makes use of the well-known assembly injection molding process. The assembly injection molding procedure, as one version of the multi component injection molding process, is characterized by its ability to produce moveable connections, whereby one process operation, one component geometry and one material selection influences the resulting movability. These parameters can thus be used for the adjusting of a movability of defined connections. Hereby, a shrinkage behavior of the respective connection component has the greatest influence, whereby the size of the shrinkages can vary due to the type of material and manufacturing process and can thereby be influenced by means of an appropriate adjusting of the influencing parameters as it is needed.

Based on this knowledge and according to a first aspect, the present disclosure presents a method for the manufacturing of a bearing element of a shift device for a motor vehicle transmission, whereby the method comprises the following steps:
Providing a bearing element with at least one projection and a coupling joint for the mechanical coupling of a selector lever in order to select a shift position of the motor vehicle transmission; and
Overmolding the projection by means of an assembly injection molding process with a bearing bushing material in order to form a bearing bushing in order to mount the bearing element in a moveable manner.

The motor vehicle transmission can e.g. refer to an automatic transmission. The shift device can be coupled to the motor vehicle transmission mechanically or electronically. It is e.g. possible that the shift device is designed as a component of a shift-by-wire system. A bearing element can be understood to be a component that can be connected to a selector lever in a moveable manner in order to guide a movement of the selector lever along one or more predefined motion axes, for example along a shifting axis for the manual shifting of the transmission and a selection axis for the selection of an operating mode of the transmission. The bearing element can e.g. be designed as a crosspiece. A projection can be understood to be e.g. a cylinder-shaped axle stub which serves for the holding of the bearing element within a corresponding mounting fixture, possibly a housing or guiding rail that is solidly fixed to the motor vehicle chassis. At least the projection or the bearing element can be made from a plastic material or out of metal. A bearing bushing material can be understood to be a plastic material that can be used to overmold around the projection in a ring or capsule shaped manner by means of the assembly injection molding procedure. By means of a suitable material selection or the addition of an additive, the plastic material may feature additional friction-reducing characteristics. A coupling joint for the mechanical coupling can be understood to be a connecting element of two construction elements that are to be connected to each other in a mechanical way. The coupling joint can e.g. refer to a socket for the accommodation of an inlet element or an inlet element that can be inserted into a socket.

In the individual case, the presented approach is based on the knowledge that bearing bushings can be molded onto a bearing element in order to mount a selector lever for a motor vehicle transmission in one assembly injection molding process, by means of which the bearing bushing can be designed in such a way that it is moveable in relation to the bearing element. In this way, it is possible to achieve a bearing with little backlash and low tolerances. In addition, the advantage of such a manufacturing process when compared to conventional solutions, is the significantly reduced manufacturing costs, since an assembly of separate bearing bushings is eliminated. Preferably, the step of providing can be carried out at the same time or shortly before the step of the overmolding. It is furthermore preferred that in the step of providing, the bearing element is formed with the projection and the coupling joint. It is further preferred with reference to the bearing bushing material and the projection or the bearing element, to choose the parameters for the assembly injection molding procedure that are influencing a shrinkage behavior of these components in such a way, that the bearing bushing material and the material for the projection or for the bearing element feature different shrinkages in order to achieve an allowance for clearance between the bearing bushing and the projection that is necessary when manufacturing the movability. A shrinkage is characterized in that the respective material undergoes a change in volume during the shrinkage process, without material being removed or without exerting any pressure on the material. Depending on e.g. a compound selection for the bearing bushing and for the projection or for the bearing element as well as depending on the injection molding sequence, it is possible to accomplish an expanding of the outer bushing material, which results in a reduction of the inner diameter of the overmolded bearing bushing during the shrinkage process, as well as shrinking away of the inner projection material, which leads to a reduction of the outer diameter of the projection during the shrinkage process. An appropriately selected allowance of the clearance between the projection and the bearing bushing can be realized in this way.

Along with the step of providing, it is furthermore possible to provide or form the coupling joint with an opening to stick the selector lever through the bearing element and/or to hold the selector lever within the bearing element, whereby the coupling joint features at least one opening to accommodate a bearing bolt of the selector lever in the area of the opening. In the step of overmolding, the bearing bushing material can be particularly injected into the opening in order to form a bearing shell for the mounting of the bearing bolt. By means of the opening, the bearing element can e.g. be designed in a type of a framework. A bearing shell can be understood to be a ring-shaped element, in which the bearing bolt can be moveably mounted. By means of this embodiment, the bearing bolt and the bearing shell can be manufactured in a cost-effective and time-saving manner in one single manufacturing process. Keeping these influencing parameters for the shrinkage process of the respectively used materials in the assembly injection molding procedure in mind, it is possible that the bearing bushing material will shrink away less than the material of the bearing element expands. In this way, the bearing shell can also be braced very firmly into the opening. Such a resulting bracing force can e.g. be sufficient to firmly hold the bearing shell in the opening so that it cannot twist.

In the step of providing, it is furthermore possible to provide or design the bearing element with at least one element that secures against twisting. Such an element that secures against twisting can be understood to be e.g. a fin that is protruding into the opening or a jagged edge area of the opening. Such an element that secures against twisting can be molded in the step of overmolding with the bearing bushing material, so that a connection that is secure against twisting may result between the bearing shell and the bearing element after the bearing bushing material cools off.

It is further preferred that during the step of overmolding, the bearing bushing is formed with at least one element that secures against twisting that is arranged at an outer circumference of the bearing bushing, which engages with an anti-twist element of a bearing bushing seat of a housing. Thus, the danger of a relative twisting between the bearing bushing and the housing can at least be minimized. The anti-twist element can particularly be designed in the beforementioned manner. Alternatively, the anti-twisting element can be a groove which engages with a corresponding rib of the housing, that is formed into the bearing bushing seat.

According to a further embodiment, the bearing element can be prepared or designed with at least one other projection in the step of providing, whereby the further projection is furthermore overmolded with the bearing bushing material in the step of overmolding, in order to form another bearing bushing for the mounting of the bearing element. This offers the advantage that multiple mounting points can be realized on the bearing element in one single manufacturing step.

These mounting points can be positioned in a particularly convenient way, if the bearing element is provided or designed in accordance with a further embodiment in the step of providing, so that the projection and the further projection extend along one common axis. The projection can hereby be particularly formed on a first outer wall of the bearing element and the other projection on a second outer wall of the bearing element that is opposite to the first outer wall. In this way, it is possible to arrange the one projection and the further projection at a maximum distance to each other, so that a maximum support width and thus a very stable mounting of the bearing element can be achieved.

According to a further aspect, the hereby presented approach provides a further bearing element for a shift device for a motor vehicle transmission, whereby the bearing element features at least one projection and a coupling joint for the mechanical coupling of the selector lever to select a shift position of the motor vehicle transmission, whereby the projection is overmolded by means of an assembly injection molding procedure with a bearing bushing material in order to form a bearing bushing for the mounting of the bearing element, whereby the bearing element and the bearing bushing are mounted in such a way that they are moveable towards each other. The bearing element is preferably formed by means of a method according to one of the described preferred embodiments.

According to one embodiment, the bearing element can comprise at least one further projection which is overmolded with the bearing bushing material, in order to form another bearing bushing. The projection and the further projection can particularly extend along one common projection axis. The projection can hereby be particularly formed on a first outer wall of the bearing element and the further projection on a second outer wall of the bearing element that is opposite to the first outer wall. It is further preferred that the projection and the further projection extend in a coaxial manner.

According to a further aspect of the present disclosure, a shift device for a motor vehicle transmission is proposed, wherein the shift device comprises a bearing element according to one of the preferred embodiments described above.

According to a further embodiment, the shift device can be provided with a selector lever with at least one first bolt element and a second bolt element. The coupling joint can form an opening through which the selector lever can be stuck through. The coupling joint can have at least one first opening and a second opening in the area of the opening. The bearing bushing material can be injected into the first opening to form a first bearing shell and can be injected into the second opening to form a second bearing shell. The first bolt element can be rotatably mounted in the first bearing shell and the second bolt element can be rotatably mounted in the second bearing shell so that they can rotate around a swivel axis, in order to enable a movement of the selector lever around the swivel axis. The bolt elements can be connected to the selector lever in a rotationally fixed manner and extend along the swivel axis. The bolt elements can e.g. refer to end sections of a bearing bolt that is struck through the selector lever, whereby the end sections protrude beyond the selector lever.

A gimbal bearing of the selector lever can be realized if the projection axis and the swivel axis are oriented in different directions, i.e. transverse to each other. For example, the projection axis and the swivel axis can run perpendicular to each other.

The present approach further provides a device coupled to a memory that is comprising a program code to perform or control all of the steps of a method according to one of the before-mentioned embodiments.

Such a device can e.g. be understood to be a machine or a tool to carry out the manufacturing process in accordance with the hereby described embodiments. The memory preferably refers to a machine-readable data carrier, such as a semi-conductor memory, a hard disk memory or an optical memory, which is used for carrying out the method according to one of the above-described embodiments when the program is executed. A computer-supported device, such as e.g. a computer can preferably be used to run the program, which can be coupled to the device in a wire-less way, e.g. by means of Bluetooth or WLAN or in a wired manner, e.g. by means of a USB connecting cable. It is alternatively preferred that the device may comprise the memory or the computer-assisted device with the memory. It is furthermore alternatively preferred that the memory may be a component of a machine-readable removable data carrier, which can be removably inserted and read by a reading device of the apparatus or of the computer-supported device such as e.g. a drive.

The disclosure is explained in more detail by means of the attached illustrations It is depicted.

In the following description of preferred embodiments of the present disclosure, same or similar reference signs are used for elements that are depicted in the various figures and that function in a similar way, whereby a repeated description of these elements is omitted.

Figure 1A:
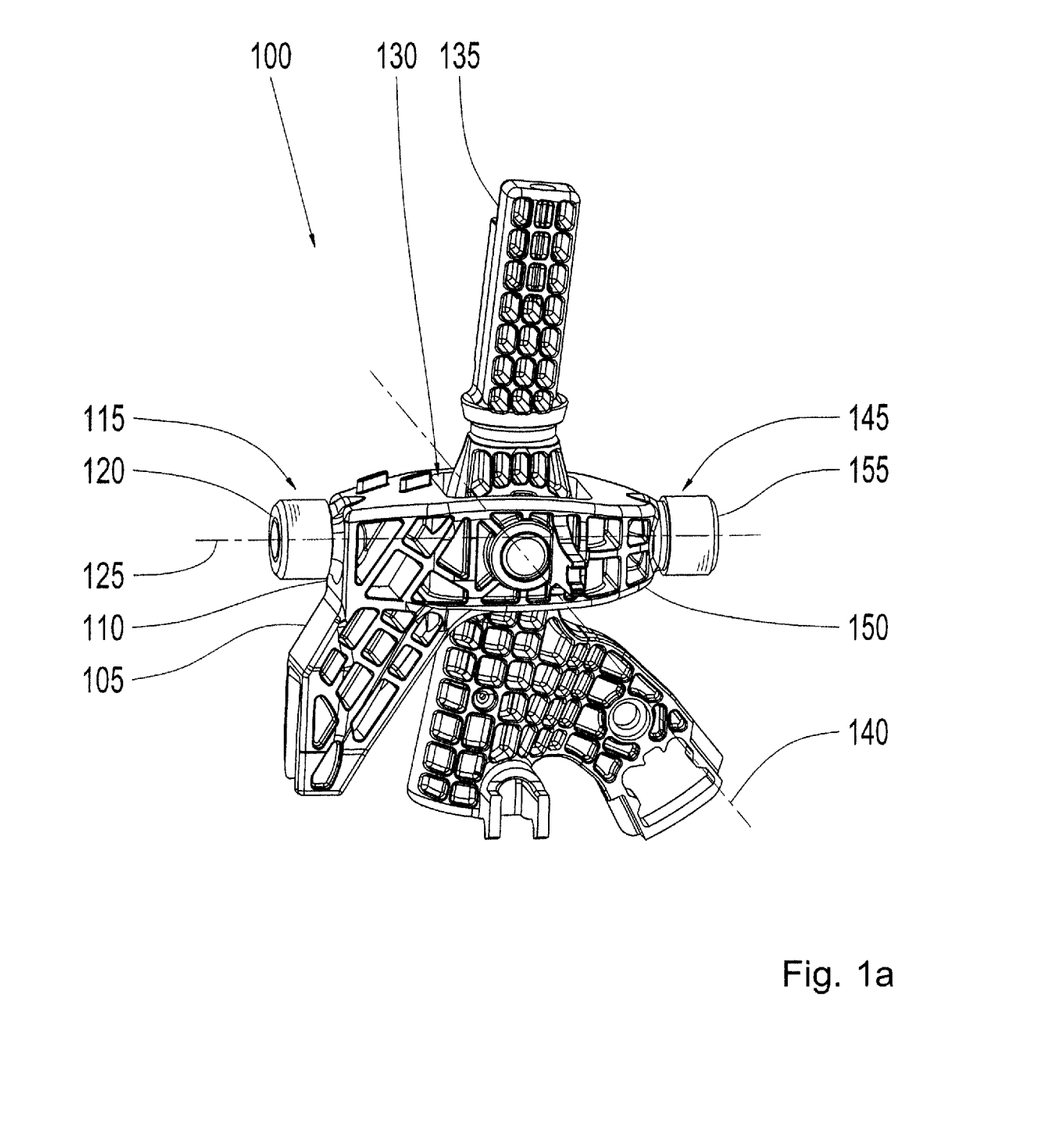
FIG. 1*a*, 1*b* is a schematic three-dimensional depiction of a shift device according to an embodiment of the present disclosure.

FIG. 1*a* depicts a schematic three-dimensional depiction of a shift device 100 according to an embodiment of the present disclosure. The shift device 100 comprises a bearing element 105, which is realized as a crosspiece according to one embodiment. A projection 115 is formed at a first outer wall 110 of the bearing element 105. A capsule-shaped bearing bushing 120 is arranged on the projection 115, which can be rotated around a projection axis 125 on the projection 115. In FIG. 1*a*, the projection 115 is largely covered by the bearing bushing 120. Bearing bushing 120 is made out of a bearing bushing material which is injected around the projection 115 in one assembly injection molding procedure. The bearing bushing material and a material of the bearing element 105, and thus of the projection 115 feature different shrinkages and/or different melting points, whereby the bearing bushing material is made in such a way that, when the material cools down, it expands less than the material of bearing element 105 shrinks away. This ensures that, after the bearing bushing material has cooled down, the bearing bushing 120 can be rotated with a backlash that is adjusted according to the need, in this embodiment with minimum backlash around projection 115.

According to this embodiment, the bearing element 105 is designed with an opening 130 as coupling joint for the mechanical coupling of a selector lever 135. Selector lever 135 is stuck through opening 130. Selector lever 135 is mounted around a swivel axis 140 in a moveable manner within opening 130, whereby swivel axis 140 is exemplified to run perpendicular to projection axis 125.

The shift device 100 further includes another projection 145 which is formed on the second outer wall 150 of the bearing element 105 that is opposite to the first outer wall 110. A capsule-shaped further bearing bushing 155 is arranged on the other projection 145, which can be rotated around the projection axis 125 on the other projection 145, similar to bearing bushing 120. The projection 120 and the further projection 145 thus extend along the projection axis 125. The other projection 145 is largely covered by the other bearing bushing 155. The other bearing bushing 155 is also made out of bearing bushing material, in the same way as in the previously described manner of manufacturing bearing bushing 120.

Bearing bushing 120 and the further bearing bushing 155 can be connected to a herein not depicted housing of shift device 100, which is e.g. firmly fixed to the chassis of a motor vehicle, so that bearing element 105 can be mounted in the housing in such a way, that it can be swiveled around projection axis 125. The housing may comprise e.g. guiding rails, in which the bearing bushing 120 and the further bearing bushing 155 are mounted in a moveable manner, so that bearing element 105 can additionally be moved along the swivel axis 140.

Bearing bushing 120 and the other bearing bushing 155 can be slit, respectively.

Bearing element 105 and selector lever 135 can be equipped with a plurality of bracings that are arranged like honeycombs, which serve for the stiffening of bearing element 105 or of selector lever 135.

Figure 1B:
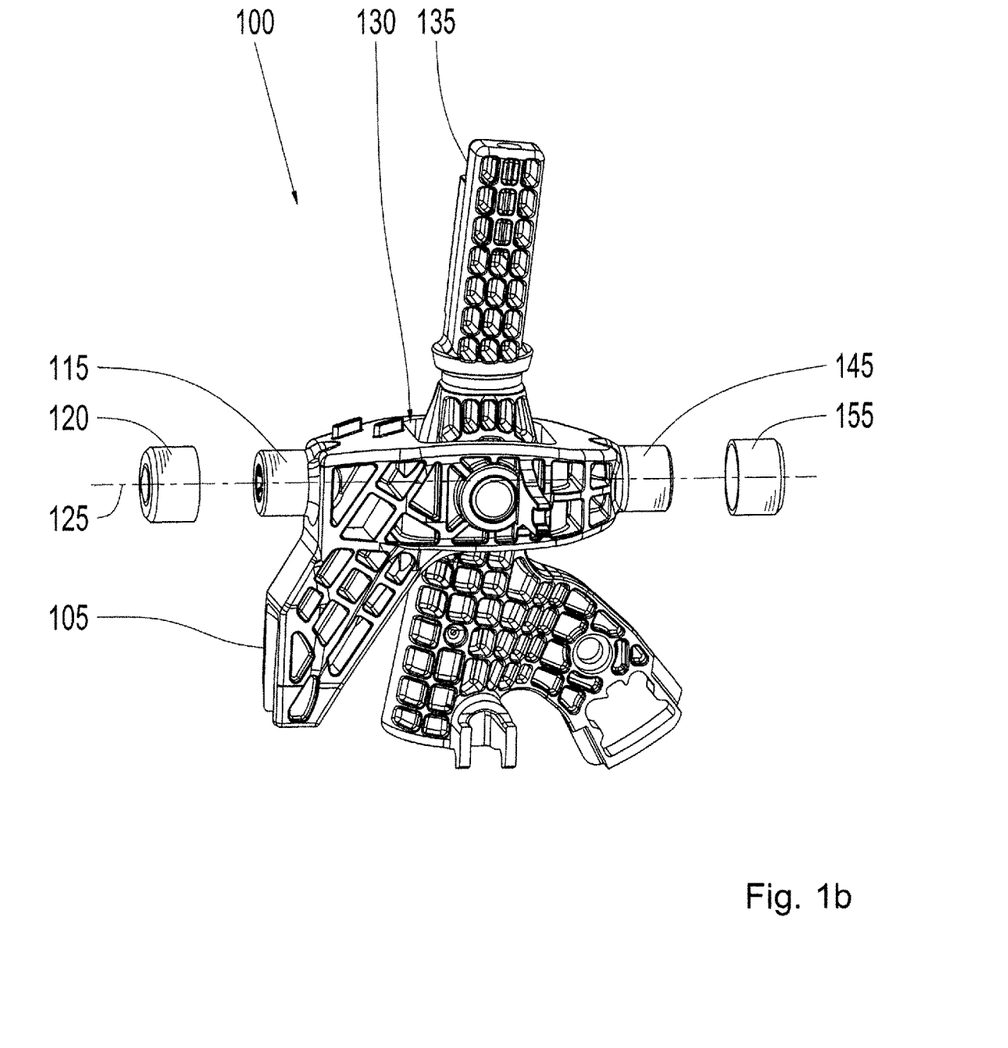

FIG. 1*b* depicts the shift device 100 that was shown in FIG. 1*a* with removed bearing bushings 120, 155, so that the projections 115, 145 are visible. The projection 115 and the further projection 145 are made in a cylinder-shaped way and feature a respective groove as an example, which runs parallel to projection axis 125.

Figure 2:
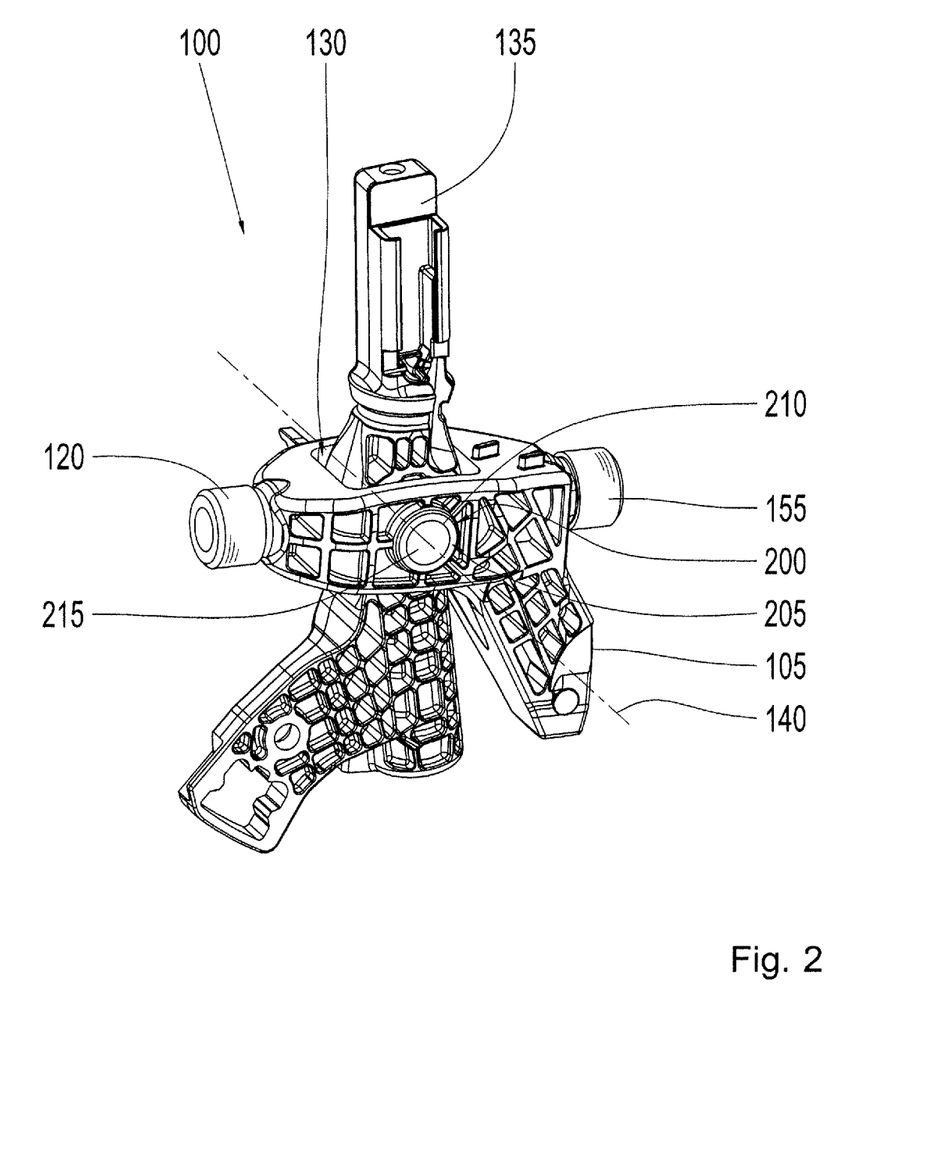
FIG. 2 is a schematic three-dimensional depiction of a shift device according to an embodiment of the present disclosure.

FIG. 2*a* depicts a schematic three-dimensional depiction of a shift device 100 according to an embodiment of the present disclosure. In contrast to the FIGS. 1*a* and 1*b*, the depicted shift device 100 in FIG. 2 is additionally realized with a bearing shell 200 that is molded from the bearing bushing material. Bearing element 105 features a circular opening 205 in the area of opening 130, whereby swivel axis 140 runs through the center of the opening 205. Bearing shell 200 is situated in opening 205, whereby bearing shell 200 was injection molded into opening 205 in one assembly injection molding procedure, just like the bearing bushings 120, 155. Since the material of bearing element 105 expands more when cooling down than the bearing bushing material of the bearing shell 200 shrinks away, bearing shell 200 is braced into opening 205 after cooling down so that it cannot twist.

Selector lever 135 is arranged with a bearing bolt 210. An end section 215 of bearing bolt 210 is mounted within bearing shell 200 in such a way that it can turn around swivel axis 140.

Figure 3A:
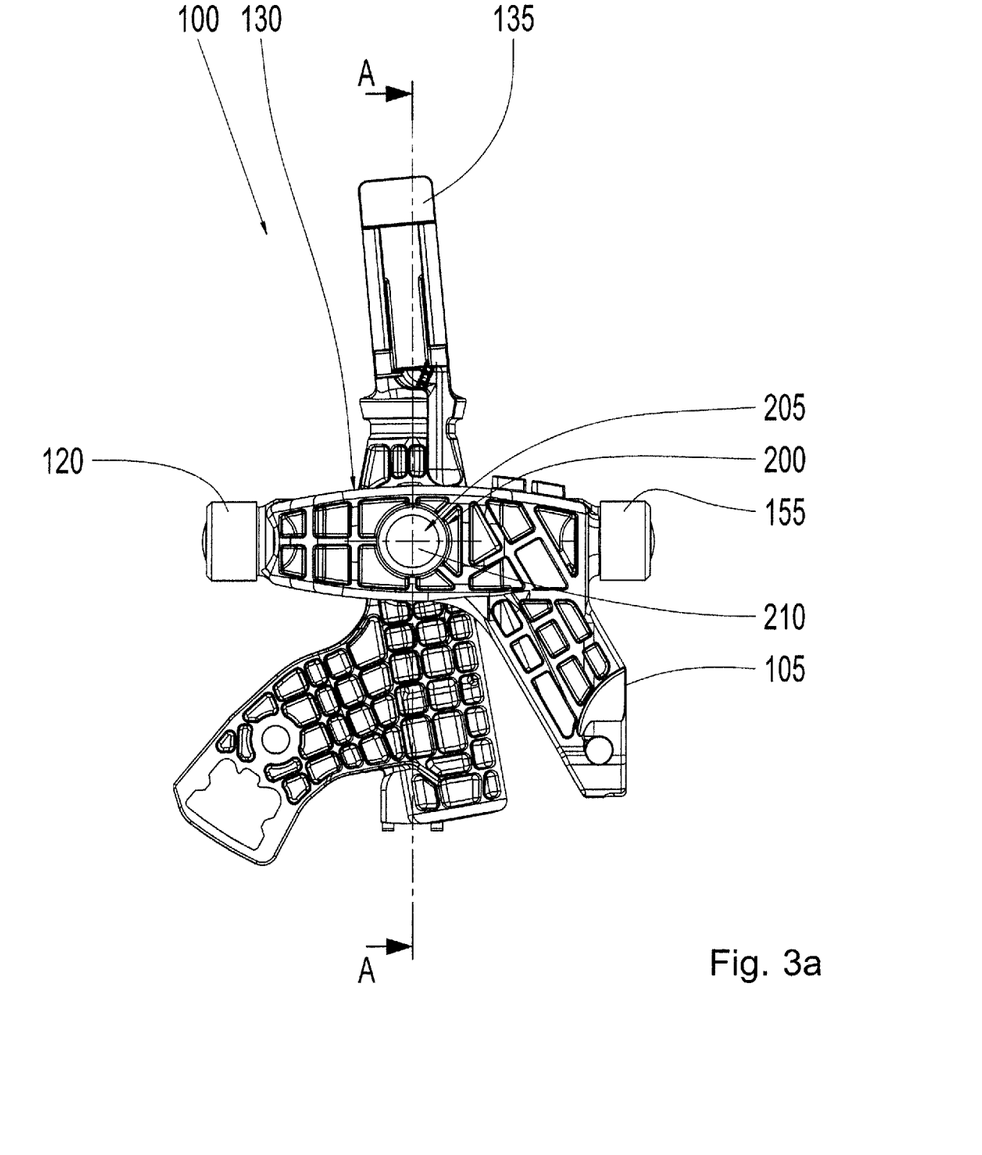
FIG. 3*a*, 3*b* are a schematic depiction of a shift device according to an embodiment of the present disclosure.

FIG. 3*a* depicts a side view of the shift device 100 that was shown in FIG. 2.

Figure 3B:
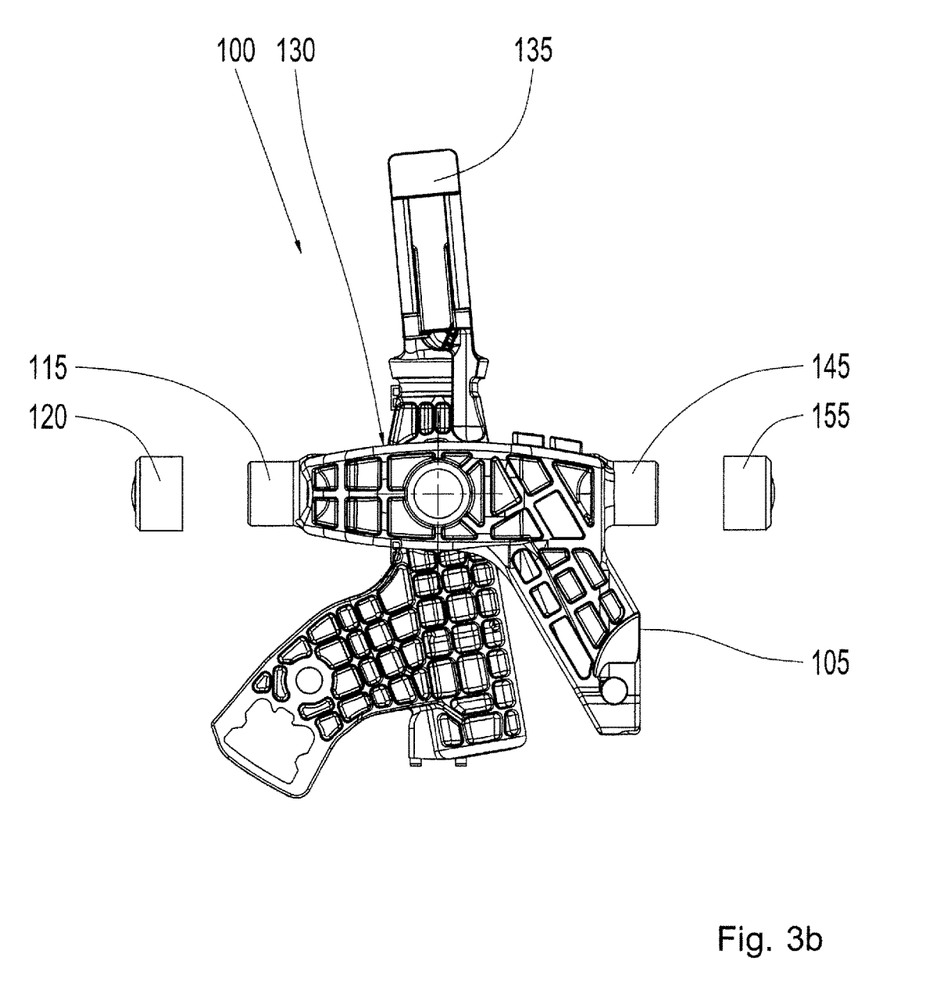

FIG. 3*b* depicts a side view of the shift device 100 that was shown in FIG. 2 with removed bearing bushings 120, 155.

Figure 4A:
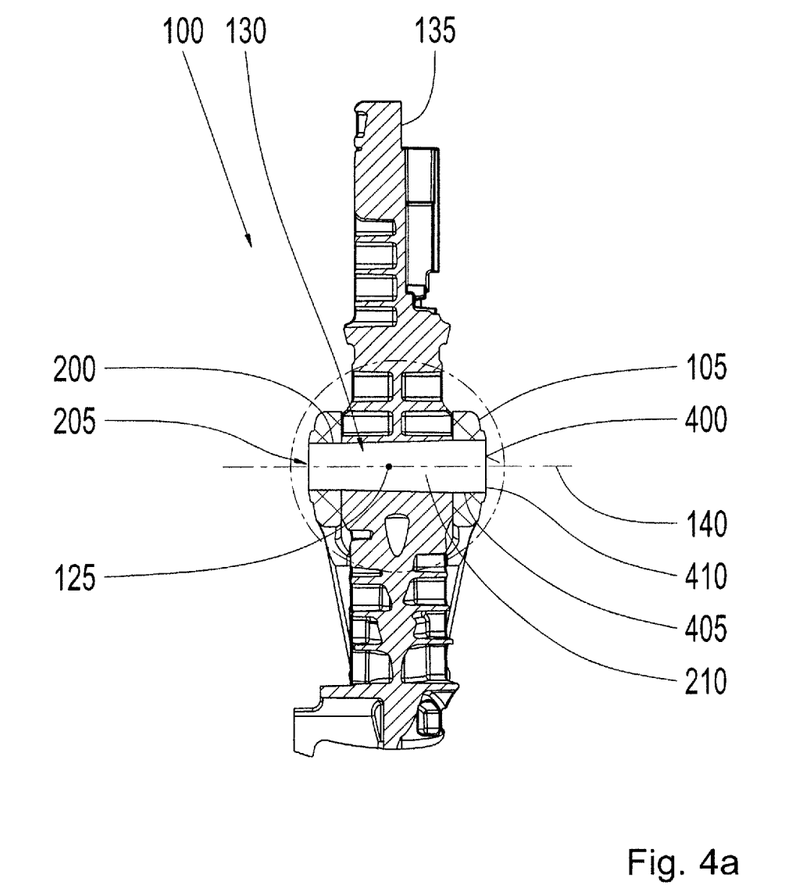
FIG. 4*a*, 4*b* are a schematic cross-sectional depiction of a shift device according to an embodiment of the present disclosure.

FIG. 4*a* depicts a schematic cross-sectional depiction of a shift device 100 according to an embodiment of the present disclosure. FIG. 4*a* depicts a section through selector lever 135 and through the bearing element 105 along a sectional axis A-A as it is shown in FIG. 3*a*, which runs through an intersection point of projection axis 125 and the swivel axis 140.

Bearing element 105 is designed with a further opening 400, which is formed on a side of the opening 130 that is opposite to the opening 205, so that swivel axis 140 runs through the center point of opening 205 and the center point of the further opening 400. Selector lever 135 is arranged between the openings 205, 400 within opening 130.

A further bearing shell 405 is situated in the further opening 400, which is made of the bearing bushing material just like bearing bushing 200, and which is thus fixed in the further opening 400 so that it cannot twist. A further end section 410 of bearing bolt 210 is mounted within the further bearing shell 405 in such a way that it can turn around swivel axis 140.

Figure 4B:
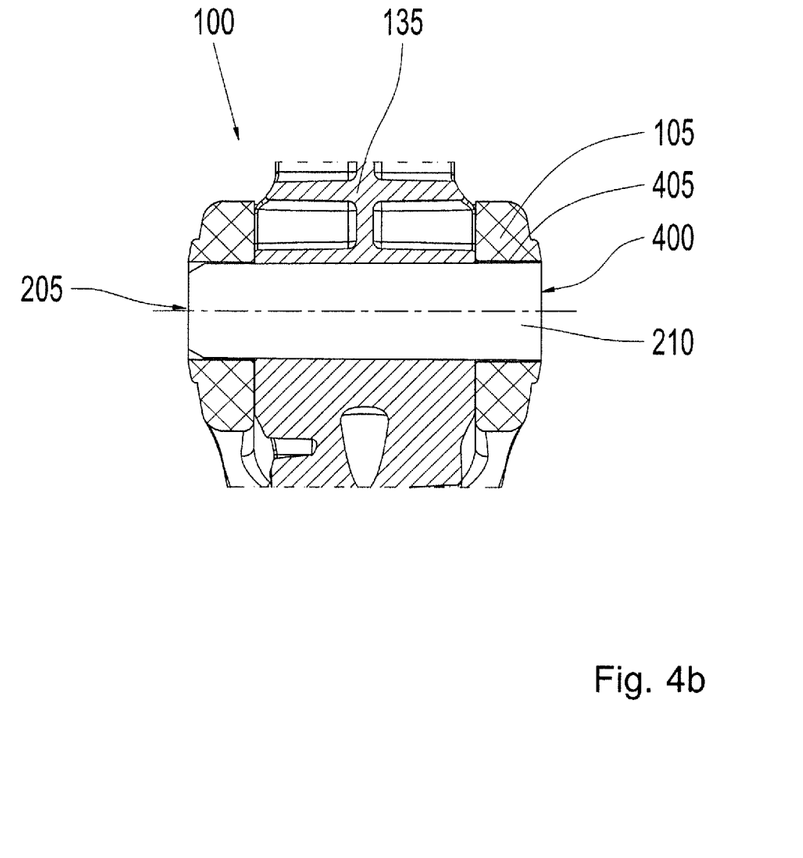

FIG. 4b depicts a magnified representation of a partial section of shift device 100 that is highlighted by a circle in FIG. 4a.

Figure 5:
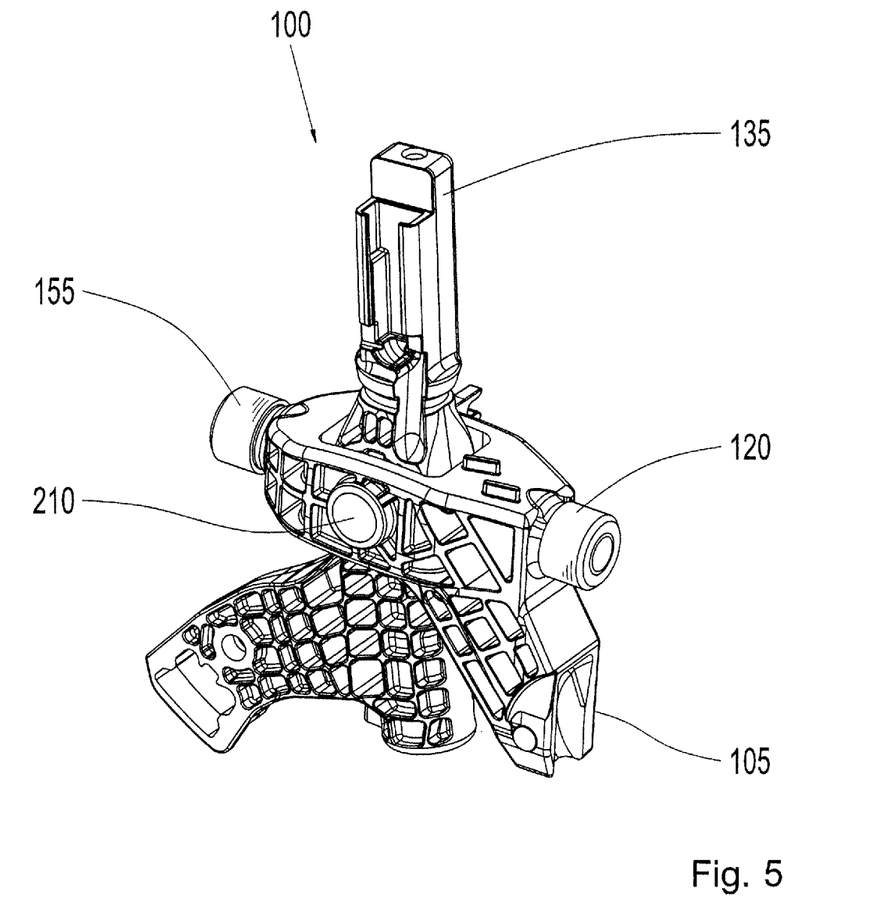
FIG. 5 is a schematic three-dimensional depiction of a shift device according to an embodiment of the present disclosure.

FIG. 5 depicts a schematic three-dimensional representation of the shift device 100 as it is shown in FIG. 3a.

According to an embodiment of the present disclosure, the shift device 100 is realized by means of a crosspiece as bearing element 105. In crosspiece 105, selector lever 135 is mounted in conjunction with bearing shell 200 and the further bearing shell 405 by means of a knurl bolt or a bearing bolt 210, as it was described earlier. Crosspiece 105 itself is mounted in a housing by means of bushings 120, 155. The housing can be made of multiple parts. Despite a housing partition, it is possible to realize a smooth-running bearing of crosspiece 105 with minimum backlash by means of the use of the bushings 120, 155. A complex assembly group can be provided or formed via the assembly injection molding procedure with less effort and therefore cost-effective by means of the additional use of the bearing shell 200 and the further bearing shell 405 for bearing bolt 210.

Figure 6:
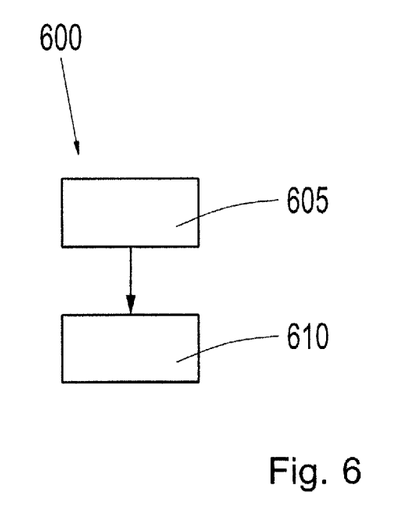
FIG. 6 is a flowchart of a method for manufacturing a shift device according to an embodiment of the present disclosure.

FIG. 6 depicts a flow diagram of a method 600 for manufacturing a bearing element of a shift device according to an embodiment of the present disclosure. A bearing element is provided in a step 605, which comprises at least one projection and a coupling joint for the mechanical coupling of a selector lever in order to select a shift position of a motor vehicle transmission. In a further step 610, the projection is over-molded by means of an assembly injection molding process with a bearing bushing material in order to form a bearing bushing to mount the bearing element in a moveable manner.

According to an embodiment of the present disclosure, it is thus possible to inject two or more bushings directly onto a crosspiece in one assembly injection molding process. The known method for the manufacturing of a hinge connection is hereby used. It is for example possible to produce a twistable connection between the crosspiece and the bushings in that the crosspiece and the bushings are manufactured from largely incompatible materials with different melting points and different shrinkages. Due to a suitable combination of materials, a connection that has little backlash and that is easily moveable is achieved after the demolding. The crosspiece can e.g. be made of a polyamide such as PA6 GF and the bushings can be made of polybutylene terephthalate (PBT). Alternatively, it is also possible to use a material combination made of plastic and metal.

Sections for securing against twisting and loss or also elements to compensate backlash can also be directly molded onto the bushings.

According to an embodiment, a gimbal bearing of the selector lever can be realized completely by means of assembly injection molding. In this case, it is possible that two additional bearing shells for the selector lever bearing can be injected onto the crosspiece in addition to the two bushings for the mounting in the housing. It is thus possible to produce a complex assembly group in basically one processing step.

Figure 7:
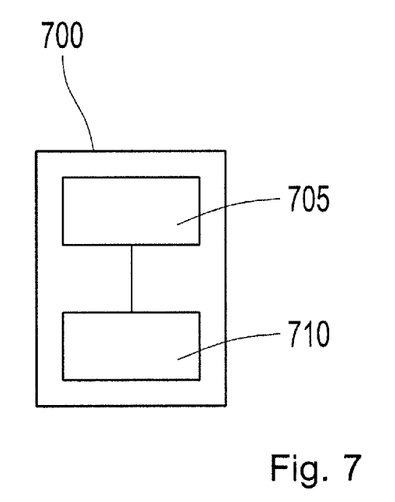
FIG. 7 is a block diagram of a device for performing a method according to an embodiment of the present disclosure.

FIG. 7 depicts a block diagram of a device 700 for carrying out a method according to an embodiment of the present disclosure. The device 700 comprises a unit 705 for providing a bearing element, which features at least one projection and a coupling joint for the mechanical coupling of a selector lever in order to select a shift position of the motor vehicle transmission. Device 700 further comprises a unit 710 for overmolding the projection by means of an assembly injection molding process with a bearing bushing material in order to form a bearing bushing to mount the bearing element in a moveable manner. By means of a suitable adjusting of the influencing parameters for the assembly injection molding procedure, the shrinkage behavior of the bearing bushing material can be selected in such a way, that the bearing bushing material expands to such a degree, that the bearing bushing is formed in a relatively rotatable way with regard to the bearing element. It is further preferred that the shrinkage behavior of the bearing bushing material and of the material for the bearing element for a simultaneous forming of the bearing element and of the bearing bushing, can be selected in such a way, that the bearing bushing material expands to a lesser degree than the material of the bearing element shrinks away. As a result, it is also possible to achieve a movability or a backlash between the bearing element and the bearing bushing that can be definable in a predetermined way.

The units 705, 710 may, for example, be injection molding tools for carrying out the assembly injection molding procedure, in order to produce the bearing element and the bearing bushing in such a way that they are relatively rotatable in relation to the other.

REFERENCE SIGNS

100 Shift device
105 Bearing element
110 First outer wall
115 Projection
120 Bearing bushing
125 Projection axis
130 Opening
135 Selector lever
140 Swivel axis
145 Further projection
150 Second outer wall
155 Further bearing bushing
200 Bearing shell
205 Opening
210 Bearing bolt
215 First bolt element, also referred to as end section
400 Further opening
405 Further bearing shell
410 Second bolt element, also referred to as end section
600 Method for producing a shift device
605 Providing the bearing element
610 Molding of the projection of the bearing element
700 Device
705 Unit for providing the bearing element
710 Unit for injection molding of the projection of the bearing element

The invention claimed is:

1. A method for the manufacturing of a bearing element of a shift device for a motor vehicle transmission, the method comprises the following steps:

providing a bearing element with a projection and a coupling joint for the mechanical coupling of a selector lever to select a shift position of the motor vehicle transmission; and overmolding the projection through an assembly injection molding procedure with a bearing bushing material in order to form a bearing bushing for the moveable mounting of the bearing element.

2. The method according to claim 1, wherein in the step of providing, the projection or the bearing element is made out of a plastic material or metal, and in the step of overmolding, a plastic material is used as the bearing bushing material.

3. The method according to claim 1, wherein in the step of providing, the coupling joint is provided with an opening to insert the selector lever through the bearing element and to hold the selector lever within the bearing element, whereby the coupling joint comprises a first opening to accommodate a bearing bolt of the selector lever in the area of the opening, whereby in particular in the step of overmolding, the bearing bushing material is additionally injected into the first opening in order to form a bearing shell for the rotatable mounting of the bearing bolt.

4. The method according to claim 1, wherein in the step of providing, the bearing element is provided with at least one further projection, whereby the further projection is overmolded with the bearing bushing material in the step of overmolding in order to form another bearing bushing for the mounting of the bearing element.

5. The method according to claim 4, wherein in the step of providing, the bearing element is formed in such a way that the projection and the further projection extend along a common projection axis, whereby the projection is formed on a first outer wall of the bearing element and the further projection on a second outer wall of the bearing element that is opposite to the first outer wall.

6. A bearing element for a shift device for a motor vehicle transmission, the bearing element comprising:
a projection and
a coupling joint for the mechanical coupling of a selector lever to select a shift position of the motor vehicle transmission,
whereby the projection is overmolded through an assembly injection molding procedure with a bearing bushing material in order to form a bearing bushing for the mounting of the bearing element, whereby the bearing element and the bearing bushing are mounted in a way that they are moveable towards each other.

7. The bearing element according to claim 6, wherein the bearing element comprises at least one further projection which is overmolded with the bearing bushing material, in order to form another bearing bushing, whereby the projection and the further projection extend along a common projection axis, whereby the projection is formed on a first outer wall of the bearing element and the further projection on a second outer wall of the bearing element that is opposite to the first outer wall.

8. A shift device for a motor vehicle transmission, the shift device comprising:
a bearing element according to claim 6,
wherein the selector lever comprises a first bolt element and a second bolt element, whereby the coupling joint forms an opening, whereby the selector lever is inserted through the opening, whereby the coupling joint comprises a first opening and a second opening in the area of the opening, whereby the bearing bushing material is injected into the first opening in order to form a first bearing shell, and the bearing bushing material is injected into the second opening in order to form a second bearing shell, and whereby the first bolt element in the first bearing shell and the second bolt element in the second bearing shell are mounted in such a way that they are rotatable around a swivel axis in order to allow a movement of the selector lever around the swivel axis.

9. The shift device according to claim 8, wherein a projection axis through the projection and the swivel axis run substantially perpendicular to each other.

10. A device coupled to a memory that comprises a program code to perform or control all of the steps of a method according to claim 5.

11. The device according to claim 10, wherein the device is designed to carry out or control all the steps of the method according to claim 5.

12. The method according to claim 1, wherein in the step of overmolding, the bearing bushing material shrinks away less than the material of the bearing element expands.

13. The method according to claim 3, wherein in the step of providing, an element protruding into the opening in the coupling joint is further provided in order to prevent twisting of the bearing shell.

14. The method according to claim 1, wherein in the step of overmolding, the bearing bushing is formed with an element protruding at an outer circumference of the bearing bushing in order to secure against twisting of the bearing element within a housing mounted to the motor vehicle.

15. The method according to claim 1, wherein in the step of overmolding, the bearing bushing is formed with depression at an outer circumference of the bearing bushing in order to secure against twisting of the bearing element within a housing mounted to the motor vehicle, wherein the depression is configured to engage a corresponding protrusion on the housing.

16. The bearing element according to claim 6, wherein the bearing bushing includes an element protruding at an outer circumference of the bearing bushing in order to secure against twisting of the bearing element within a housing mounted to the motor vehicle.

17. The bearing element according to claim 6, wherein the bearing bushing includes a depression at an outer circumference of the bearing bushing in order to secure against twisting of the bearing element within a housing mounted to the motor vehicle, wherein the depression is configured to engage a corresponding protrusion on the housing.

18. The bearing element according to claim 6, wherein the bearing bushing material shrinks away less than the material of the bearing element expands after the overmolding.

19. The bearing element according to claim 7, wherein the coupling joint comprises an opening to insert the selector lever through the bearing element and to hold the selector lever within the bearing element, whereby the coupling joint further comprises a first opening to accommodate a bearing bolt of the selector lever in the area of the opening, whereby the bearing bushing material is additionally overmolded into the first opening in order to form a bearing shell for the rotatable mounting of the bearing bolt.

20. The bearing element according to claim 6, wherein the bearing element further comprises honeycomb bracing.

* * * * *